Patented Oct. 25, 1932

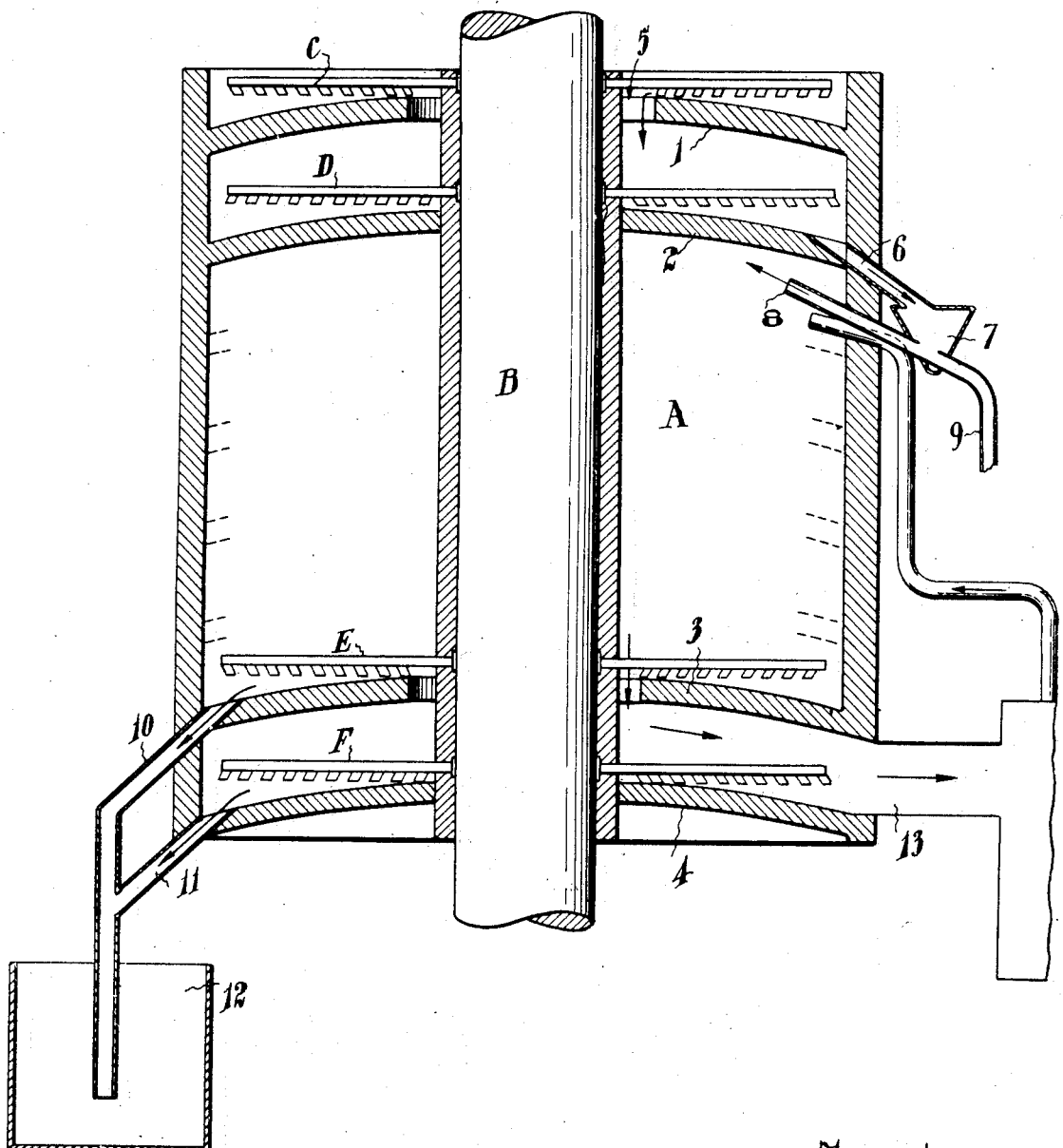

1,884,348

UNITED STATES PATENT OFFICE

BYRON ANGUS STIMMEL, KENNETH DUNCAN McBEAN, AND GRAHAM CRUICKSHANK, OF TRAIL, BRITISH COLUMBIA, CANADA, ASSIGNORS TO THE CONSOLIDATED MINING AND SMELTING COMPANY OF CANADA, LIMITED, OF MONTREAL, QUEBEC, CANADA, A COMPANY OF CANADA

METHOD OF ROASTING MINERALS CONTAINING THE SULPHIDES OF ZINC, IRON, LEAD, AND COPPER, FOR THE RECOVERY OF THE METAL AND THE SULPHUR DIOXIDE GAS THEREFROM

Application filed February 10, 1930. Serial No. 427,414.

Our invention relates to a method of roasting minerals containing the sulphides of zinc, iron, lead, and copper, singly or in combination, in gaseous suspension, characterized in that the charge in a finely divided, dry state, or tailings containing such sulphides, in a finely divided, dry state, are blown into the roasting chamber and are disseminated, concurrently with the air blast, through it, for the exposure of every surface of each particle to the oxidizing action of the air; the roast is effected by the combustion of the sulphur content of the charge, supported by the air blast, for converting the sulphides into oxides, some sulphates, and sulphur dioxide; the temperature and time of the roast are regulated for promoting the oxidation of the charge without fusion or incipient fusion and with the formation of the minimum amount of ferrates when roasting zinc sulphides containing iron sulphides; the roasted material settling at the bottom of the roasting chamber is removed for further processing; the sulphur dioxide is exhausted from the roasting chamber in a higher $SO_2$ concentration than under present well known methods of roasting; and the formation of zinc sulphates when roasting zinc sulphides, is controlled by regulating the temperature and the period of exposure of the roasted material to the sulphatizing action of the gases from the roast.

During our experimental tests when roasting a zinc sulphide bearing charge, we ascertained that the formation of sulphates occurred largely while the roasted product remained in contact with the sulphur dioxide bearing gases at a temperature slightly below that of the roasting temperature, and that as the temperature of the roasted product, while remaining on the hearths of the roasting chamber after the actual roasting was completed, soon reached the temperature favorable for the formation of sulphates, it was desirable to remove the roasted material from the roasting chamber as quickly as possible, this desirable end being achieved in our present process to a greater extent than in any hitherto well known process.

We also ascertained that when zinc and iron were present in the charge, the longer the particles of the charge remained in contact with each other and in contact with the high temperature of the roasting chamber, either during the actual roasting process or on the hearths after the roasting process, the greater would be the amount of ferrates formed, and therefore the present method of keeping the particles separate from each other during the roasting and of removing them quickly from the hearths of the roasting chamber after the roasting was completed, thus separating them quickly from the high temperature of the roasting chamber, resulted in the formation of a smaller amount of ferrates, which was very desirable.

We also ascertained that by utilizing the sulphur content of the ore, exclusively, as fuel, sulphur dioxide can be recovered in a high state of concentration suitable for the manufacture of sulphuric acid; that by returning the sulphur dioxide containing gases to the roasting chamber, thereby supplanting part of the air, the temperature thereof may be lowered when necessary and the gases further enriched in sulphur dioxide; that a roasting furnace may be operated according to this method of roasting at the same tonnage as, or a higher tonnage than, in the ordinary way; that there are less sulphates on the roasting chamber hearth than on the hearth below it; that sulphates increase in quantity with each additional hearth below the hearth of the roasting chamber; and therefore that the amount of sulphate can be controlled by removing the roasted material either from the hearth of the roasting chamber or from any of the hearths lower down in the furnace, the lower hearths having more sulphates than the first settling hearth of the roasting chamber.

An apparatus employed for carrying out our method was an altered "wedge" mechanical furnace, shown diagrammatically in the accompanying drawing, which comprised originally eight hearths. Four of these were removed from the middle of the furnace to provide an unobstructed roasting chamber A of large cross sectional area and relatively great depth, the roasting chamber, by this alteration being approximately twenty-three feet in diameter and fifteen feet six inches in height. The revolving shaft B extending axially through the furnace was stripped of arms for these hearths, and provided with four rabble arms, C, D, E, and F, on each of the remaining four hearths, 1, 2, 3, and 4, respectively.

A concrete example of the application of the process to a charge containing substantially zinc and iron sulphides is described immediately below but the process is equally applicable to a charge containing substantially only iron sulphides or substantially only zinc sulphides, and which in either case may contain lesser amounts of the sulphides of lead and copper.

In the concrete example the material used was a zinc sulphide ore containing zinc, iron, antimony, arsenic, lead and other metals. This ore was ground to a finely divided condition, and the zinc concentrated by a flotation process. The wet concentrates were conveyed to the uppermost hearth 1, across which they were moved by the revolving of the shaft B and rabble arms C and delivered through the central opening 5 to the hearth 2, across which they were moved by the rabble arms D and evacuated through the passage 6 into a collecting chamber or hopper 7. The concentrates during their travel over the hearths 1 and 2 were dried sufficiently, by radiated heat from the furnace, to permit of their introduction, from the collecting chamber or hopper, into the roasting chamber A. When necessary, the concentrates were ground after drying to break up any lumps formed, and to polish or make fresh surface to the zinc particles where the surface had become coated with an oxide film during the drying stage of the process. From the collecting chamber or hopper 7 the concentrates were delivered into the top of the roasting chamber through an injector pipe 8 which extended from the collecting chamber or hopper into the roasting chamber with its nozzle in the vicinity of the bottom surface of the hearth 2. An air pipe 9 was connected with the hopper 7 and sufficient pressure was maintained through the hopper and injector pipe for blowing the concentrates into the top of the roasting chamber and disseminating them, concurrently with the air, through it in a downward direction to the lower hearths 3 and 4, upon which the roasted material settled, and from which it was evacuated through the passages 10 and 11, into a storage chamber or bin 12 for further processing. The sulphur dioxide was simultaneously exhausted through the outlet 13 and delivered to a settling chamber or cottrell plant for the separation of the solids from the gas which was then transferred to a sulphuric acid plant or, in the event that it was necessary to lower the temperature of the roasting chamber and enrich the gas in sulphur dioxide, all or part of the gas was returned to the roasting chamber, the amount being returned depending upon the degree to which it was desired to lower the temperature.

The concentrates and air blast concurrently moved downwards, and during the entire operation there was a complete dissemination of the zinc particles through the roasting chamber which permitted of a free suspension of each particle of the charge and the exposure of every surface of each particle to the oxidizing gas and to the heat of combustion during the full period of travel from the top to the bottom of the roasting chamber and resulted in the complete oxidation of the zinc and of the sulphur, and also of the other metals. The free suspension of the particles in the oxidizing gas preserved a minimum of contact between them and inhibited the formation of ferrates during the oxidation.

The heat employed for converting the zinc sulphide into zinc oxide and sulphur dioxide was produced exclusively, by the combustion of the sulphur content of the charge supported by the air blast. The amount of air supply was governed by the principle that the quantity must be properly proportioned, for oxidizing all the zinc and other sulphides and converting all the sulphur into sulphur dioxide of suitable concentration for the manufacture of sulphuric acid, with some excess to provide for uncontrollable contingencies arising during the roast. By providing an air supply of these proportions and by disseminating the air and concentrates through the roasting chamber, each zinc particle was completely enveloped or surrounded by constantly changing air during its passage from the top to the bottom of the roasting chamber and its exposure under correct conditions of temperature insured substantially all of the zinc being converted to zinc oxide. A low velocity of the charge, in its downward movement through the roasting chamber was maintained from the top to the bottom of the furnace the period of roast was determined by the depth of the roasting chamber. When the roasting chamber was not deep enough the roasting was incomplete.

When roasting, the temperature was maintained at the ignition point of the sulphides. This temperature ranged between 650° C. and 900° C. and was dependent more or less upon the tonnage of the concentrates being charged. At the commencement of our investigations or tests we thought that it might be necessary to use extraneous fuel to accomplish the roast. We found, however, that this was not only incorrect but that we would have considerable excess heat from the combustion of the sulphur content, exclusively, and that the tonnage could be increased when the heat was properly controlled to prevent it rising above the critical temperature of the charge and causing gumminess or a sticky condition; and we also found that we could conveniently control the heat by passing all or part of the gases already exhausted from the roasting chamber back through said chamber either without cooling the said gases or, when necessary, after cooling the said gases by first passing them through waste heat boilers, or if a still greater lowering of the temperature was required by spraying into the roasting chamber water or solution obtained in the later processing.

We also ascertained that two distinct advantages resulted from returning to the roasting chamber the gases already exhausted from the roasting chamber and therefore containing the sulphur dioxide obtained from the previous roasting, namely:

(a) The gas, being partially impoverished of free oxygen, was not as efficient as air and therefore itself brought about a lowering of the temperature; and (b) The returning of this gas to the roasting chamber resulted in its sulphur dioxide content being increased to a degree that made it more suitable for the manufacture of sulphuric acid.

In conducting our operations the two uppermost hearths 1 and 2 were heated by radiation from the roasting chamber A, and the concentrates we used contained 50% zinc, 11.5% iron, 3.5% lead, and 33.0% sulphur, which were delivered on the uppermost hearth 1 and ploughed by the rabbles C to the hearth 2, and dried by the radiated heat from the roasting chamber. From the hearth 2 the dried concentrates were ploughed by the rabbles D through the opening 6 and screened into the hopper 7 for the removal of the lumps or balls formed while drying. The coarse material was subsequently ground and returned to the hopper. From the hopper the dried material passed through the injector pipe 8 into the top of the roasting chamber, the depth of which provided sufficient time for each suspended particle to oxidize in its descent to the hearth at the bottom of the roasting chamber. The heat was obtained solely from the combustion of the sulphides and ranged from 850° C. to 925° C. and was dependent upon the quantity of concentrates passing through the roasting chamber, which in this particular test amounted to about 40 dry tons per twenty-four hours.

The bulk of the roasted material which settled on the hearth 3 was ploughed by rabbles E to the lower hearth 4, and from the hearth 4 by the rabbles F and collected in the storage chamber or bin 12. The gas formed in the roasting chamber passed downward through the lower hearth, and out of the chamber through the outlet 13, to a flue chamber. The dust settled out of the gas in the flue chamber, and the gas was evacuated in a high state of concentration suitable for the manufacture of sulphuric acid ($H_2SO_4$). The gas at the outlet 13 had a temperature of about 585°C., and at the standard pressure and temperature carried 5.6% to 8% $SO_2$. The roasted material evacuated from hearth 4 assayed 56.5% zinc oxide, which was 85% of the total zinc of the charge, 2.0% zinc sulphate, which was 1.5% of the total zinc, 23.4% zinc ferrate, which was 12.8% of the total zinc, and the balance was principally lead sulphate.

One form of apparatus for carrying out the above described method is made the subject matter of our co-pending application Serial No. 596,740, filed March 3, 1932, for apparatus for roasting mineral bearing particles.

Having thus fully described our invention, what we claim as new and desire to secure by Letters Patent is:

1. A method of roasting, in gaseous suspension, minerals or tailings containing the sulphides of zinc and iron, which comprises blowing the charge in a finely divided dry state into the upper part of an unobstructed roasting chamber of large cross sectional area and relatively great depth to descend therethrough, disseminating the particles of the charge therein and causing their free suspension for preserving a minimum of contact between them in the oxidizing gas; maintaining the temperature within the roasting chamber above the ignition point of the charge and conducting the roast exclusively by the combustion of its sulphur content supported only by the air of the blast for converting the sulphides into metallic oxides and sulphur dioxide gas in a high state of purity and concentration; and separately evacuating the roasted material and sulphur dioxide gas at the bottom of the roasting chamber.

2. A method of roasting, in gaseous suspension, minerals or tailings containing the sulphides of zinc and iron, which comprises blowing the charge in a finely divided dry state into the upper part of an unobstructed roasting chamber of large cross sectional area and relatively great depth, to descend therethrough, disseminating the particles of the charge therein and causing their free suspension for preserving a minimum of contact between them in the oxidizing gas and inhibiting the formation of ferrates when roasting a charge containing iron sulphides; maintaining the temperature within the roasting chamber above the ignition point of the charge and conducting the roast exclusively by the combustion of its sulphur content supported only by the air of the blast for converting the sulphides into metallic oxides and sulphur dioxide gas in a high state of purity and concentration; controlling the time period after the roast during which the material settling at the bottom of roasting chamber is exposed to the high temperature of the oxidation; and separately evacuating the roasted material and sulphur dioxide gas at the bottom of the roasting chamber.

3. A method of roasting, in gaseous suspension, minerals or tailings containing the sulphides of zinc and iron, which comprises blowing the charge in a finely divided dry state into the upper part of an unobstructed roasting chamber of large cross sectional area and relatively great depth to descend therethrough, disseminating the particles of the charge therein and causing their free suspension, for preserving a minimum of contact between them in the oxidizing gas; maintaining the temperature within the roasting chamber above the ignition point of the charge and conducting the roast exclusively by the combustion of its sulphur content supported only by the air of the blast for converting the sulphides into metallic oxides and sulphur dioxide gas in a high state of purity and concentration; regulating the temperature and time period of the roast for promoting the oxidation of the charge without fusion or incipient fusion; and separately evacuating the roasted material and sulphur dioxide gas at the bottom of the roasting chamber.

4. A method of roasting, in gaseous suspension, minerals or tailings containing the sulphides of zinc and iron, which comprises blowing the charge in a finely divided dry state into the upper part of and downwardly through an unobstructed roasting chamber of large cross sectional area and relatively great depth to descend therethrough; disseminating the particles of the charge therein and causing their free suspenion for preserving a minimum of contact between them in the oxidizing gas; maintaining the temperature within the roasting chamber above the ignition point of the charge and conducting the roast exclusively by the combustion of its sulphur content supported only by the air of the blast for converting the sulphides into metallic oxides and sulphur dioxide gas in a high state of purity and concentration; controlling the temperature and the time period after the roast during which the material settling at the bottom of the roasting chamber is exposed to the sulphatizing action of the gas; and separately evacuating the roasted material and sulphur dioxide gas at the bottom of the roasting chamber.

5. A method of roasting, in gaseous suspension, minerals or tailings containing the sulphides of zinc and iron, which comprises blowing the charge in a finely divided dry state into the upper part of an unobstructed roasting chamber of large cross sectional area and relatively great depth to descend therethrough; disseminating the particles of the charge therein, and causing their free suspension for preserving a minimum of contact between them in the oxidizing gas; maintaining the temperature within the roasting chamber above the ignition point of the charge and conducting the roast exclusively by the combustion of its sulphur content supported only by the air of the blast for converting the sulphides into metallic oxides and sulphur dioxide gas in a high state of purity and concentration; separately evacuating the roasted material and sulphur dioxide gas from the bottom of the roasting chamber; and returning all or a portion of the evacuated gas to the roasting chamber.

6. A method of roasting, in gaseous suspension, minerals or tailings containing the sulphides of zinc and iron, which comprises blowing the charge in a finely divided dry state into the upper part of an unobstructed roasting chamber of large cross sectional area and relatively great depth to descend therethrough; disseminating the particles of the charge therein, and causing their free suspension for preserving a minimum of contact between them in the oxidizing gas and inhibiting the formation of ferrates when roasting a charge containing iron sulphides; maintaining the temperature within the roasting chamber at or above the ignition point of the charge and conducting the roast exclusively by the combustion of its sulphur content supported only by the air of the blast for converting the sulphides into metallic oxides and sulphur dioxide gas in a high state of purity and concentration; regulating the temperature and time period of the roast for promoting the oxidation of the charge without fusion or incipient fusion; controlling the time period after the roast during which the roasted material settling at the bottom of the roasting chamber is exposed to the sulphatizing action of the gas; controlling the time period after the roast during which the material settling at the bottom of the roasting chamber is exposed to the high temperature of the oxidation; separately evacuating the roasted material and sulphur dioxide gas from the bottom of the roasting chamber; and returning all or a portion of the evacuated gas to the roasting chamber.

7. A method of roasting minerals or tailings containing the sulphides of zinc and iron, which comprises drying the charge, blowing it in a finely divided condition into the upper part of an unobstructed roasting chamber of large cross sectional area and relatively great depth to descend therethrough; disseminating the particles of the charge therein and causing their free suspension for preserving a minimum of contact between them in the oxidizing gas; maintaining the temperature within the roasting chamber above the ignition point of the charge, conducting the roast exclusively by the combustion of its sulphur content supported only by the air of the blast for converting the sulphides into oxides and sulphur dioxide; and separately evacuating the roasted particles and the sulphur dioxide gas at the bottom of the roasting chamber.

Dated at Trail, British Columbia, this 10th day of January, A. D. 1930.
BYRON ANGUS STIMMEL.
GRAHAM CRUICKSHANK.

Dated at Toronto, Ontario, this 29th day of January, A. D. 1930.
KENNETH DUNCAN McBEAN.